(12) United States Patent
Schmidt et al.

(10) Patent No.: US 7,397,022 B2
(45) Date of Patent: Jul. 8, 2008

(54) SENSOR ARRANGEMENT TO PREVENT REFERENCE LIGHT INCIDENT ON SIDE OF PHOTODIODE

(75) Inventors: Manuel Schmidt, Waghaeusel (DE); Robert Figueria, San Jose, CA (US)

(73) Assignee: Vishay Semiconductor GmbH, Heilbronn (DE)

( * ) Notice: Subject to any disclaimer, the term of this patent is extended or adjusted under 35 U.S.C. 154(b) by 650 days.

(21) Appl. No.: 10/817,445

(22) Filed: Apr. 1, 2004

(65) Prior Publication Data

US 2005/0218306 A1 Oct. 6, 2005

(51) Int. Cl.
*H01J 5/02* (2006.01)
*H01J 40/14* (2006.01)

(52) U.S. Cl. .............................. 250/239; 250/214 SW; 250/221; 340/555; 345/175

(58) Field of Classification Search .................. 345/175; 250/214 SW, 221, 239; 340/555
See application file for complete search history.

(56) References Cited

U.S. PATENT DOCUMENTS

| | | | |
|---|---|---|---|
| 4,279,465 A | 7/1981 | Vojvodich | |
| 4,721,384 A | 1/1988 | Dietrich et al. | |
| 4,752,799 A * | 6/1988 | Stauffer | 396/109 |
| 4,874,242 A | 10/1989 | Bezard et al. | |
| 5,140,152 A | 8/1992 | Van Zeghbroeck | |
| 5,486,946 A * | 1/1996 | Jachimowicz et al. | 359/263 |
| 5,806,965 A * | 9/1998 | Deese | 362/249 |
| 6,111,248 A * | 8/2000 | Melendez et al. | 250/239 |
| 6,301,035 B1 | 10/2001 | Schairer | |
| 6,320,686 B1 | 11/2001 | Schairer | |
| 6,362,468 B1 * | 3/2002 | Murakami et al. | 250/221 |
| 6,373,215 B1 * | 4/2002 | Grabmaier et al. | 318/483 |
| 6,486,945 B1 | 11/2002 | Haerle et al. | |
| 6,748,409 B1 * | 6/2004 | Toraichi et al. | 708/313 |
| 6,784,409 B2 * | 8/2004 | Kitani | 250/208.1 |
| 7,123,351 B1 * | 10/2006 | Schaefer | 356/4.07 |
| 2003/0020004 A1 | 1/2003 | Reime | |

FOREIGN PATENT DOCUMENTS

| | | |
|---|---|---|
| GB | 1 466 486 | 3/1977 |
| GB | 2 011 610 | 7/1979 |
| WO | WO 01/54276 | 7/2001 |

* cited by examiner

*Primary Examiner*—Georgia Y. Epps
*Assistant Examiner*—Seung C. Sohn
(74) *Attorney, Agent, or Firm*—W. F. Fasse; W. G. Fasse

(57) ABSTRACT

A sensor arrangement, in particular as part of a reflection light barrier, includes a carrier as well as a photodiode, a first light emitting diode for emitting a measuring light beam, and a second light emitting diode for emitting a reference light beam, in particular a reference light beam pulsed offset in time with respect to the measuring light beam, arranged on the carrier, and further includes a light permeable housing enclosing the photodiode and the two light emitting diodes. The second light emitting diode is arranged on the carrier and in the housing such that the reference light emitted by it is essentially not incident on the side of the photodiode but rather is reflected internally in the housing to be incident onto an upper surface of the photodiode.

18 Claims, 2 Drawing Sheets

SENSOR ARRANGEMENT TO PREVENT REFERENCE LIGHT INCIDENT ON SIDE OF PHOTODIODE

FIELD OF THE INVENTION

The present invention relates to a sensor arrangement, in particular as part of a reflection light barrier, comprising a carrier on which a photodiode, a first light emitting diode for the transmission of a measuring light beam, in particular a pulsed measuring light beam, and a second light emitting diode for the transmission of a reference light beam, in particular a reference light beam pulsed offset in time with respect to the measuring light,beam, and a light transmitting housing enclosing the photodiode and the two light emitting diodes are arranged.

BACKGROUND INFORMATION

In a known sensor arrangement for reflection light barriers of this type, two LED chips and one photodiode chip are arranged on a circuit board. The LED chip provided for the transmission of the reference light beam directly irradiates the adjacent photodiode, with a large part of the light being radiated into the side surface of the photodiode due to the position of both chips on one plane. The other LED chip provided for the transmission of the useful light beam, in contrast, only radiates upwardly, since it is located in a separate part of the housing. If a reflecting object is located in its beam cone, the reflected light is incident on the photodiode from above.

On the irradiation of a photodiode with a light pulse, the photo current resulting from the irradiation of the photodiode follows the light pulse with a specific delay which is quantified by the rise time and the decay time of the photo current. These times generally depend both on the electrical parameters of the photodiode, above all on its capacity, and on its external electrical wiring, substantially on the load resistance. There is furthermore, however, a clear dependence on the direction of the optical radiation. If the light is not incident onto the semiconductor chip primarily from above, but penetrates into the chip through the side surfaces, a considerable increase in the rise time and decay time occurs. The photodiode therefore becomes slower. The reason for this is probably the following: with lateral radiation, a large portion of the production of free charge carrier pairs caused by absorption of the light takes place in the substrate of the chip. Before these charge carrier pairs can contribute to an electrical current, they must first diffuse into the region of the p-n junction, which results in a delay.

In the specific application, both LED chips are operated in an alternately pulsed manner, whereby the sensitivity to ambient light of the reflection light barrier can be eliminated with the help of an electronic circuit. The different time behavior for the light radiation onto the photodiode from the side or from above causes large problems for the evaluation electronics in this process.

BRIEF SUMMARY OF THE INVENTION

These problems are solved by a sensor arrangement having the features according to the present invention. The solution accordingly consists of a sensor arrangement, in particular as part of a reflection light barrier, comprising a carrier on which a photodiode, a first light emitting diode for the transmission of a measuring light beam, in particular a pulsed measuring light beam, and a second light emitting diode for the transmission of a reference light beam, in particular a reference light beam pulsed offset in time with respect to the measuring light beam, and a light transmitting housing enclosing the photodiode and the two light emitting diodes are arranged, which is characterized in that the second light emitting diode is arranged on the carrier such that the reference light transmitted by it is essentially not incident on the photodiode from the side.

The reference light transmitted by the second light emitting diode therefore substantially acts on the photodiode only along an indirect reference light path. The reference light transmitted by the second light emitting diode is in particular substantially incident onto the photodiode due to the reflection at the wall of the housing. This reflection is in particular based on a total reflection.

In accordance with a particularly preferred embodiment of the invention, the photodiode is arranged on a first plane of the carrier and the second light emitting diode serving for the radiation of the reference light is arranged on a second plane. This is particularly simple in manufacture and is in particular then already alone sufficient to largely avoid a lateral radiation of reference light into the photodiode, when the two planes are offset with respect to one another at least by the height of the photodiode or of the second light emitting diode. The radiation of reference light onto the photodiode can thereby only take place via reflections at the walls of the housing such that the radiation onto the photodiode substantially takes place from above.

The second light emitting diode is preferably arranged on a higher plane than the photodiode. Generally, however, the arrangement could also be reversed.

In particular a circuit board is provided as the carrier, with the circuit board preferably being formed in the manner of a sandwich plane of at least two layers. This is also again simple and cost favorable in manufacture. The manufacture of the layers in particular takes place by lamination.

It is moreover particularly preferred for the carrier to consist of a material impermeable to light. Other irritating radiations onto the photodiode can thus also be prevented.

The housing is preferably formed by an encapsulant of light-permeable material such as epoxy resin. This material has been found to be particularly suitable to ensure both a transmission of the measuring light-to an object to be detected and a reflection of the reference light at the housing.

The housing can preferably be made chamfered in the region of the second light emitting diode for the improvement of the reflection at the walls of the housing and for the prevention of a detection of an object by the reference light. On the other hand, a lens is preferably provided in front of the first light emitting diode for the focusing of the measured light in the direction of a possible object to be detected.

BRIEF DESCRIPTION OF THE DRAWINGS

Embodiments of the invention are represented in the drawings and will be described in the following.

DETAILED DESCRIPTION OF EXAMPLE EMBODIMENTS OF THE INVENTION

Figure 1:
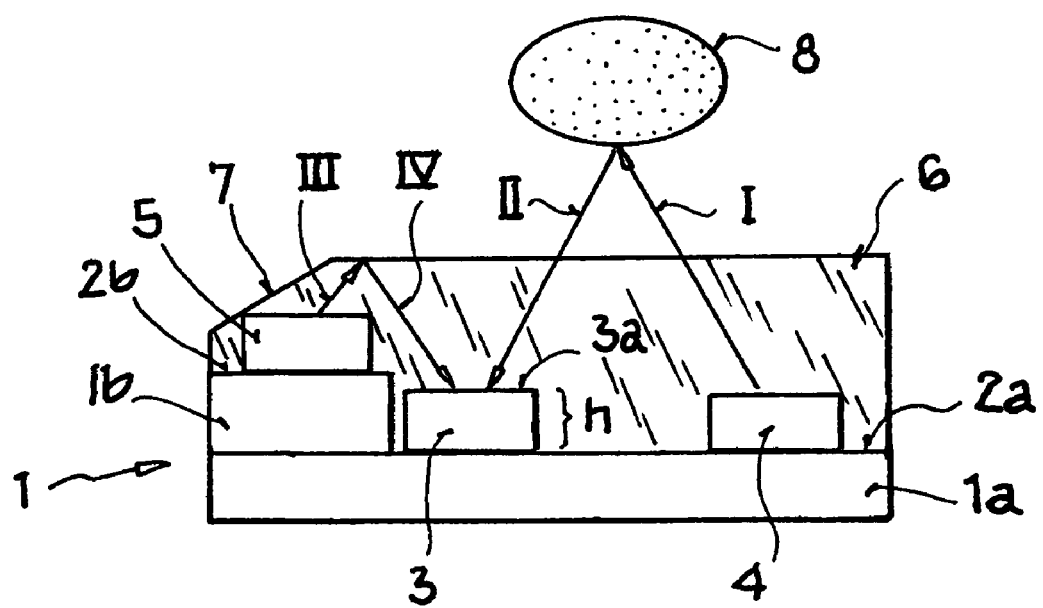
FIG. 1 schematically shows a crosssection through a sensor arrangement in accordance with an embodiment of the invention.

The sensor arrangement shown includes a circuit board 1 as a carrier comprising a first layer 1a and a second layer 1b which is laminated on it, but only covers part of the first layer 1a. Two planes 2a and 2b are thereby formed for the carrier.

A photodiode 3 and a first light emitting diode 4 are arranged next to one another on the first plane 2a, while a second light emitting diode 5 is provided on the second plane 2b. The photodiode 3 is located directly next to the second layer 1b of the carrier 1 and the height of the second layer 1b is selected to be somewhat larger than the height h of the photodiode 3. The first light emitting diode 4 is located spaced apart on the side of the photodiode 3 remote from the second light emitting diode 5.

Figure 2:
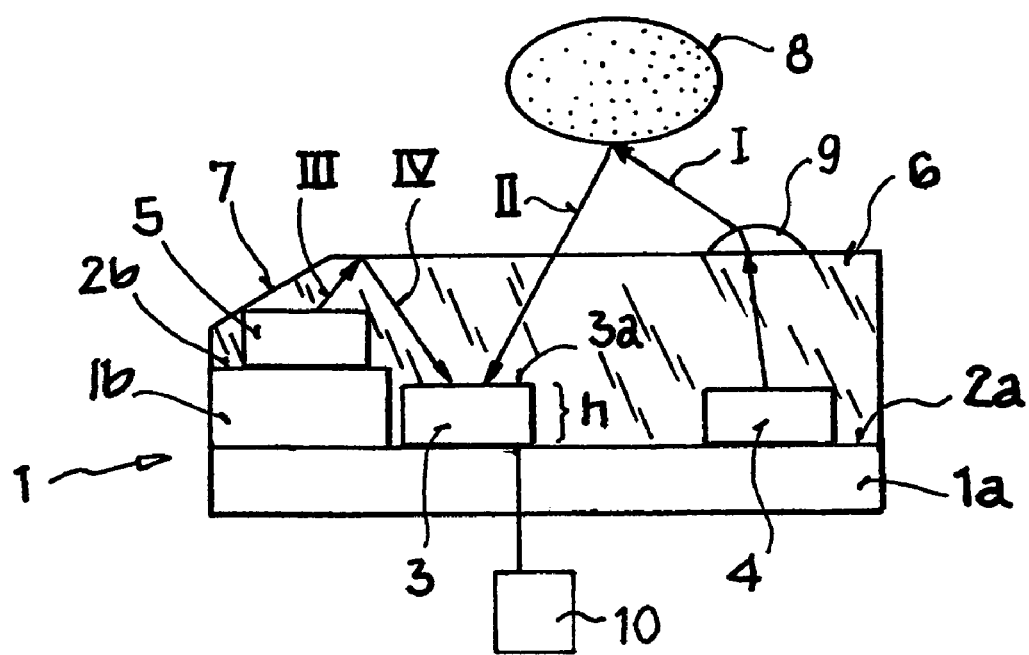
FIG. 2 schematically shows a crosssection through a sensor arrangement similar to FIG. 1, but with an added lens according to a further embodiment of the invention.

An encapsulant made from an epoxy resin is applied to the circuit board 1 and forms a housing 6 which receives the photodiode 3 and the two light emitting diodes 4 and 5. The first light emitting diode 4 is located in this process in a separate region of the housing 6 which is separated by a crosstalk barrier (not shown here) from the photodiode 3 and from the second light emitting diode 5 such that light transmitted by the first light emitting diode 4 cannot be incident on the photodiode 3 from the side. A lens 9, for example as schematically indicated in FIG. 2, can additionally be arranged in front of the first light emitting diode 4. On the other side, the housing 6 is formed with a chamfered surface 7, a so-called facet, in the region of the second light emitting diode 5.

The first light emitting diode 4 serves for the production of measuring light which exits the housing 6 and is reflected by an object 8 located in front of the housing 6. The measuring light transmitted by the first light emitting diode 4 thereby arrives at the upper side 3a of the photodiode 3, in accordance with the arrows I and II, and produces an electrical signal in it. The light emitting diode 4 is operated in a clocked manner in this process.

The second light emitting diode 5 is activated offset in time with respect to the operation of the first light emitting diode 4. The second light emitting diode 5 emits a reference light beam which is reflected at the walls of the housing 6 such that it is reflected onto the upper side 3a of the photodiode 3 in accordance with the arrows III and IV. The ambient light can be calculated in a detection unit 10 (FIG. 2) by subtraction of the two signals. In addition, the reference light signal produced by the second light emitting diode 5 can be used for a regulation.

As can be seen, the arrangement of the second light emitting diode 5 on the second plane 2b formed by the second layer 1b of the carrier board 1 prevents a lateral radiation of reference light into the photodiode 3. The reference light therefore radiates, like the reflected measuring light, onto the photodiode 3 substantially only from above. The time behavior of the reference light signal thus corresponds to that of the measured light signal in the photodiode 3, whereby the problems initially described are avoided. Low rise times and decay times of the photodiode 3 can in particular also be achieved with respect to the reference light in this manner.

Other misguided light can also largely be excluded by the forming of the two layers 1a and 1b of the carrier board 1 from a material impermeable to light.

The invention claimed is:

1. A sensor arrangement as a part of a reflection light barrier, said sensor arrangement comprising:
   a carrier;
   a photodiode arranged on said carrier;
   a first light emitting diode arranged on said carrier and adapted to emit a pulsed measuring light beam;
   a second light emitting diode arranged on said carrier and adapted to emit a reference light beam that is pulsed offset in time relative to the measuring light beam; and
   a light permeable housing arranged to enclose said photodiode, said first light emitting diode and said second light emitting diode;
   wherein said second light emitting diode is arranged on said carrier and in said housing such that the reference light beam emitted by said second light emitting diode will be reflected internally by a surface of said housing to be incident onto an upper surface of said photodiode; and
   wherein said housing, said photodiode, said first light emitting diode and said second light emitting diode are arranged and embodied so that none of the reference light beam emitted by said second light emitting diode will be incident on any lateral side surface of said photodiode.

2. The sensor arrangement in accordance with claim 1, wherein said photodiode is arranged on a first plane of said carrier and said second light emitting diode is arranged on a second plane of said carrier offset from said first plane.

3. The sensor arrangement in accordance with claim 2, wherein said first and second planes are offset with respect to one another at least by a height of said photodiode or by a height of said second light emitting diode.

4. The sensor arrangement in accordance with claim 2, wherein said second plane on which said second light emitting diode is arranged is a higher plane than said first plane on which said photodiode is arranged.

5. The sensor arrangement in accordance with claim 1, wherein said carrier comprises a circuit board.

6. The sensor arrangement in accordance with claim 5, wherein said circuit board (1) is a sandwich board having at least two layers.

7. The sensor arrangement in accordance with claim 6, wherein said layers of said carrier board are laminated to one another.

8. The sensor arrangement in accordance with claim 1, wherein said carrier consists of a material that is impermeable to light.

9. The sensor arrangement in accordance with claim 1, wherein said housing is formed by an encapsulant material that is permeable to light.

10. The sensor arrangement in accordance with claim 9, wherein said encapsulant material is an epoxy resin.

11. The sensor arrangement in accordance with claim 1, wherein said housing has a chamfered wall in a region of said second light emitting diode.

12. The sensor arrangement in accordance with claim 11, wherein said chamfered wall is a facet.

13. The sensor arrangement in accordance with claim 11, wherein said chamfered wall extends at a declination angle selected such that the reference light beam emitted from said second light emitting diode will be reflected from said chamfered wall toward said photodiode.

14. The sensor arrangement in accordance with claim 1, further comprising a lens arranged in front of said first light emitting diode and adapted to focus the measuring light beam.

15. The sensor arrangement in accordance with claim 1, wherein said housing is embodied so that the reference light beam will be reflected internally by a total reflection from said surface of said housing.

16. The sensor arrangement in accordance with claim 1, further comprising a detection unit connected to receive signals from said photodiode and adapted to calculate a portion of ambient light from a difference between a signal generated in said photodiode based on receiving the reference light beam that has been reflected and a signal generated in said photodiode based on receiving the measuring light beam that has been reflected.

17. The sensor arrangement in accordance with claim 1, wherein:

said carrier comprises a first carrier layer, and a second carrier layer laminated onto a partial area of said first carrier layer;

said second carrier layer has a thickness at least equal to or greater than a thickness of said photodiode;

said photodiode is arranged on said first carrier layer at an area not provided with said second carrier layer;

said second light emitting diode is arranged on said second carrier layer; and said housing, said photodiode, said first light emitting diode and said second light emitting diode are arranged and embodied so that the measuring light beam emitted by said first light emitting diode will exit out of said housing and can be reflected back to said photodiode from an external object outside of said sensor arrangement.

18. The sensor arrangement in accordance with claim 17, wherein said housing is embodied so that the reference light beam will be reflected internally by a total reflection from said surface of said housing.

* * * * *